United States Patent
Poon

(10) Patent No.: US 7,373,312 B1
(45) Date of Patent: May 13, 2008

(54) METHOD AND APPARATUS FOR FACILITATING USER REGISTRATION IN AN ON-LINE AUCTION ENVIRONMENT

(75) Inventor: Alex D. Poon, Los Altos Hills, CA (US)

(73) Assignee: eBay Inc., San Jose, CA (US)

( * ) Notice: Subject to any disclaimer, the term of this patent is extended or adjusted under 35 U.S.C. 154(b) by 622 days.

(21) Appl. No.: 09/730,034

(22) Filed: Dec. 4, 2000

Related U.S. Application Data

(60) Provisional application No. 60/168,842, filed on Dec. 3, 1999.

(51) Int. Cl.
*G06Q 30/00* (2006.01)
*G06F 17/30* (2006.01)
*G07F 7/00* (2006.01)

(52) U.S. Cl. ...................................................... 705/26
(58) Field of Classification Search .................. 705/26, 705/27, 14
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymayer |
| 3,687,256 A | 8/1972 | Jones |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,864,516 A | 9/1989 | Gaither et al. |
| 4,903,201 A | 2/1990 | Wagner |
| 4,992,940 A | 2/1991 | Dworkin |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |

(Continued)

FOREIGN PATENT DOCUMENTS

CA 2253543 3/1997

(Continued)

OTHER PUBLICATIONS

"Amazon.co.uk launches auctions and zShops for UK shoppers and sellers," M2 Presswire, Nov. 5, 1999.*

(Continued)

*Primary Examiner*—Mark Fadok
*Assistant Examiner*—Mila Airapetian
(74) *Attorney, Agent, or Firm*—Schwegman, Lundberg & Woessner, P.A.

(57) ABSTRACT

A method and apparatus for facilitating user registration in a network-based transaction facility are described. According to one embodiment, a user associated with a registration process in the network-based transaction facility is identified, and a verification rating is assigned to the user based on the accuracy of the registration information submitted by the user during the registration process. If the verification rating exceeds a predetermined threshold, the user is registered with the network-based transaction facility.

34 Claims, 8 Drawing Sheets

U.S. PATENT DOCUMENTS

| | | |
|---|---|---|
| 5,243,515 A | 9/1993 | Lee |
| 5,258,908 A | 11/1993 | Hartheimer et al. |
| 5,280,305 A | 1/1994 | Monroe |
| 5,280,422 A | 1/1994 | Moe et al. |
| 5,283,731 A | 2/1994 | Lalonde et al. |
| 5,285,383 A | 2/1994 | Lindsey et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,335,170 A | 8/1994 | Petteruti et al. |
| 5,345,091 A | 9/1994 | Craig |
| 5,375,055 A | 12/1994 | Togher et al. |
| 5,383,113 A | 1/1995 | Kight et al. |
| 5,394,324 A | 2/1995 | Clearwater |
| 5,402,336 A | 3/1995 | Spiegelhoff et al. |
| 5,424,944 A | 6/1995 | Kelly |
| 5,426,281 A | 6/1995 | Abecassis |
| 5,453,926 A | 9/1995 | Stroschin et al. |
| 5,485,510 A | 1/1996 | Colbert |
| 5,521,815 A | 5/1996 | Rose, Jr. |
| 5,526,479 A | 6/1996 | Barstow et al. |
| 5,553,145 A | 9/1996 | Micali |
| 5,557,728 A | 9/1996 | Garrett et al. |
| 5,592,375 A | 1/1997 | Salmon et al. |
| 5,598,557 A | 1/1997 | Doner et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,675,784 A | 10/1997 | Maxwell et al. |
| 5,689,652 A | 11/1997 | Lupien et al. |
| 5,694,546 A | 12/1997 | Reisman |
| 5,706,457 A | 1/1998 | Dwyer et al. |
| 5,708,780 A | 1/1998 | Levergood et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,719,560 A * | 2/1998 | Watkins ............... 340/5.5 |
| 5,727,165 A | 3/1998 | Ordish et al. |
| 5,771,291 A | 6/1998 | Newton et al. |
| 5,771,380 A | 6/1998 | Tanaka et al. |
| 5,790,790 A | 8/1998 | Smith et al. |
| 5,794,207 A | 8/1998 | Walker et al. |
| 5,794,219 A | 8/1998 | Brown |
| 5,799,285 A | 8/1998 | Klingman |
| 5,803,500 A | 9/1998 | Mossberg |
| 5,815,665 A * | 9/1998 | Teper et al. ............. 709/229 |
| 5,818,914 A | 10/1998 | Fujisaki |
| 5,826,241 A | 10/1998 | Stein et al. |
| 5,826,244 A | 10/1998 | Huberman |
| 5,835,896 A * | 11/1998 | Fisher et al. ............. 705/37 |
| 5,845,265 A | 12/1998 | Woolston |
| 5,845,266 A | 12/1998 | Lupien et al. |
| 5,850,442 A * | 12/1998 | Muftic ............... 705/65 |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,862 A * | 5/1999 | Hoekstra ............... 709/202 |
| 5,905,974 A | 5/1999 | Fraser et al. |
| 5,905,975 A | 5/1999 | Ausubel |
| 5,913,040 A | 6/1999 | Rakavy et al. |
| 5,922,074 A | 7/1999 | Richard et al. |
| 5,926,794 A | 7/1999 | Fethe |
| 5,991,739 A | 11/1999 | Cupps et al. |
| 6,029,141 A | 2/2000 | Bezos et al. ............. 705/27 |
| 6,035,288 A | 3/2000 | Solomon |
| 6,035,402 A | 3/2000 | Vaeth et al. |
| 6,044,363 A | 3/2000 | Mori et al. |
| 6,047,264 A | 4/2000 | Fisher et al. |
| 6,049,785 A | 4/2000 | Gifford |
| 6,055,518 A | 4/2000 | Franklin et al. |
| 6,058,417 A | 5/2000 | Hess et al. |
| 6,061,448 A | 5/2000 | Smith et al. |
| 6,073,117 A | 6/2000 | Oyanagi et al. |
| 6,085,176 A | 7/2000 | Wooolston |
| 6,104,815 A | 8/2000 | Alcorn et al. |
| 6,119,137 A | 9/2000 | Smith et al. |
| 6,161,099 A * | 12/2000 | Harrington et al. ....... 705/36 R |
| 6,178,408 B1 | 1/2001 | Copple et al. |
| 6,192,407 B1 | 2/2001 | Smith et al. |
| 6,202,051 B1 | 3/2001 | Woolston |
| 6,243,691 B1 | 6/2001 | Fisher et al. |
| 6,263,447 B1 * | 7/2001 | French et al. ............. 713/201 |
| 6,266,651 B1 | 7/2001 | Woolston |
| 6,405,175 B1 * | 6/2002 | Ng ............... 705/14 |
| 6,449,601 B1 * | 9/2002 | Friedland et al. ............. 705/37 |
| 6,675,153 B1 * | 1/2004 | Cook et al. ............. 705/74 |
| 2003/0195843 A1 * | 10/2003 | Matsuda et al. ............. 705/39 |
| 2004/0168092 A1 * | 8/2004 | Adachi ............... 713/202 |
| 2005/0033655 A1 * | 2/2005 | Woolston ............... 705/26 |
| 2005/0192896 A1 * | 9/2005 | Hutchison et al. ............. 705/40 |

FOREIGN PATENT DOCUMENTS

| | | | |
|---|---|---|---|
| FR | 2658635 A1 | | 6/1991 |
| JP | 410124593 | * | 5/1998 |
| NL | 9300266 | | 10/1993 |
| WO | WO 92/15174 | | 2/1992 |
| WO | WO 96/34356 | | 4/1996 |
| WO | WO 97/37315 | | 3/1997 |
| WO | PCT/US 01/12398 | | 8/2001 |
| WO | WO 99/63461 A1 | | 8/2001 |

OTHER PUBLICATIONS

"Bidder Beware," U.S. News & World Report, Sep. 17, 1999.*

"eBay launches the Most Comprehensive Trust and Safety Upgrades to The World's Largest Person-To-Person Trading Site," PR Newswire, Jan. 15, 1999.*

Business Editors, Persistent Software and Cysive Collaborate to Build Internet Auction Framework, New York, Sep. 13, 1999, p. 1.*

Malone, TW; Yates, J; et al., "Electrnic Markets and Electronic Hierarchies", *Communications—of the ACM*, Jun. 1987, pp. 484-497, vol. 30, No. 6, USA.

Warbelow, A; Kokuryo, J, "Aucnet: TV Auction Network System". *Harvard Business School Case/Study*, Jul. 1989, pp. 1-15, HBVR# 9-190-001, USA.

"Personal Optimized Decision/Transaction Program", *IBM Technocal Disclosure Bulletin*, Jan. 1995, pp. 83-84, vol. 38, No. 1, USA.

Neo, BS, "The implementation of an electronic market for pig trading in Singapore", *Journal of Strategic Information Systems*, Dec. 1992, pp. 278-288, vol. 1, No. 5.

Rockoff, TE; Groves, M., "Design of an Internet-based system for remote Dutch auctions", *Internet Research—Electronic Networking Applications and Policy*, Jan. 1, 1995, vol. 5, No. 4, pp. 10-16.

Massimb, MN; Phelps, BD, "Electronic Trading, Market Structure and Liquifity," *Financial Analysts Journal*, Jan.-Feb. 1994, vol. 50, No. 1, pp. 39-50, Charlottesville, Virginia.

Post, DL; Coppinger, SS, et al., "Application of Auctions as a Pricing Mechinism for the Interchange of Electric Power", *IEEE Transactions on Power Systems*, Aug. 1995, pp. 1580-1584, vol. 10, No. 3.

Hess, CM; Kemerer, CF., "Computerized Loan Organization System: An Industry Case Study of the Electronic Markets Hypothesis", *MIS Quarterly*, Sep. 1994, vol. 18, No. 3, pp. 251-274.

Reck, Martin, "Formally Specifying and Automated Trade Execution System", *Journal of Systems and Software*, 1993, pp. 245-252, vol. 21, Elsevier Science Publishing Co., Inc. New York, Ny.

"Anonymous Delivery of Goods in Electronic Commerce", *IBM Technocal Disclosure Bulletin*, Mar. 1996, pp. 363-366, vol. 39, No. 3.

Lee, G., "Electronic Brokerage and Electronic Auction: The Impact of IT on Market Structures", *Proceedings of the 29th HICSS*, 1996, pp. 397-406, vol. IV.

Clemins, E; Weber, B., "Evaluating the Prospects for Alternative Electronic Securities Markets", *International Conference on Information Systems*, 1991, pp. 53-61, vol. 12.

Mardesich, J., "Onsale Takes Auction gavel electronic", *Computer Reseller News*, Jul. 8, 1996, p. 2 continued on p. 32, Mountain View, California.

"Onsale joins fray as online shopping picks up speed: Internet Booms", *Computer Reseller News*, Jun. 5, 1995, p. 73, CMP Publications, Inc., USA.

Siegmann, Ken, "Nowhere to go but up", *PC Week*, Oct. 23, 1995, p. 1-3, vol. 12, No. 42, Ziff-Davis Publishing Company.

"Onsale: Onsale Brings Thrill of Auctions and Bargain Hunting Online; Unique Internet retail service debuts with week-long charity auction for the Computer Museum in Boston", May 24, 1995, pp. 3.

Schmid, BF., "The Development of Electronic Commerce", *Newsletter of the Competence Centre Electrnic Markets*, Oct. 1993, No. 9/10.

Tjostheim, I; Eide, J., "A case study of an on-line auction for the World Wide Web", *Norwegian Computing Center*, No Date Given, pp. 1-10.

Graham, I., "The Emergence of Linked Fish Markets in Europe", *Focus Theme*, No Date Given, pp. 1-4.

Reck, Martin., "Trading-Process Characteristics of Electronic Auctions", *Focus Theme*, No Date Given, pp. 1-7.

Van Heck, E; Ribbers, PM., "Experiences with Electronic Auctions in the Dutch Flower Industry", *Focus Theme*, No Date Given, pp. 1-6.

Lee, HG., "Aucnet: Electronic Intermediary for Used-car Transactions", *Focus Theme*, No Date Given, pp. 1-5.

Klein, S., "Introduction to Electronic Auctions", *Focus Theme*, No Date Given, pp. 1-4.

Turban, E., "Auctions and Bidding on the Internet an Assessment", *Focus Theme*, No Date Given, pp. 1-5.

Zwass, Vladimir, "Electronic Commerce: Structures and Issues", *International Journal of Electrnic Commerce*, Fall 1996, pp. 3-23, vol. 1, No. 1.

Business Editors, "Mediappraise: Mediappraise Receives National Award for Web-Baed Technology That Enables Companies to Solve Thorny HR Problems," Dec. 14, 1998, 2 pgs., www.businesswire.com.

Business Editors/Computer Writers, "Onsale: Onsale Brings Thrill of Auctions and Bargain Hunting Online; Unique Internet Retail Service Debuts With Week-Long Charity Auction For The Computer Museum in Boston," May 24, 1995, 3 pgs., http://www.dialogweb.com/cgi/dwclient?dwcommand=DWEBPRINT%20810-489267.

Meade, J., "Visual 360: A Performance Appraisal System That's 'Fun' (Evaluation)," HRMagazine, 44, 7, 2 pgs., Jul. 1999, Society for Human Resources Management.

Preist, C., et al., "Adaptive Agents in a Persistent Shout Double Auction," Proceedings, 1st International Conf. on Information and Computation Economies, Oct. 25-28, 1998, pp. 11-18, Charleston, N.C.

Resnick, P., et al., "Reputation Systems," Dec. 2000, Assoc. for Computing Machinery, Communications of the ACM, vol. 43, n. 12, 4 pgs.

\* cited by examiner

METHOD AND APPARATUS FOR FACILITATING USER REGISTRATION IN AN ON-LINE AUCTION ENVIRONMENT

RELATED APPLICATIONS

This application claims the benefit of U.S. Provisional Application No. 60/168,842 filed Dec. 3, 1999.

FIELD OF THE INVENTION

The present invention relates generally to the field of online registration and, more specifically, to facilitating user registration in a network-based transaction facility such as, for example, an Internet-based auction facility.

BACKGROUND OF THE INVENTION

One of the advantages offered by a typical network-based transaction facility, such as an Internet-based auction facility, is the simplicity and promptness of its registration process. Any one who is willing to provide some basic registration information (e.g., name, address, phone number, and email address) can immediately become a participant of the facility. Having a large number of participants benefits the facility and its members. For instance, in an auction facility with a large number of sellers, buyers are presented with a larger variety of items. Similarly, sellers benefit from conducting business in an auction facility that has a large number of buyers. Accordingly, it is important to allow a large number of registrants to successfully complete the registration process and become a member of the facility.

However, access to the network-based transaction facility cannot be unlimited. Indeed, for participants of a network-based transaction facility, verification of user identity is particularly important for enhancing user trust in the transaction facility. In other words, a reasonable assurance that a trader is who he or she claims to be may be particularly valuable and useful in providing other traders with a degree of confidence regarding that specific trader and the transaction facility itself.

Therefore, it will be advantageous to maintain such a level of identity verification of new registrants as not to unnecessary limit the access to the network-based transaction facility.

SUMMARY OF THE INVENTION

A method and apparatus for facilitating user registration in a network-based transaction facility are described. According to one embodiment, a user associated with a registration process in the network-based transaction facility is identified, and a verification rating is assigned to the user based on the accuracy of the registration information submitted by the user during the registration process. If the verification rating exceeds a predetermined threshold, the user is registered with the network-based transaction facility.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for facilitating user registration in a network-based transaction facility are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

Transaction Facility

Figure 1:
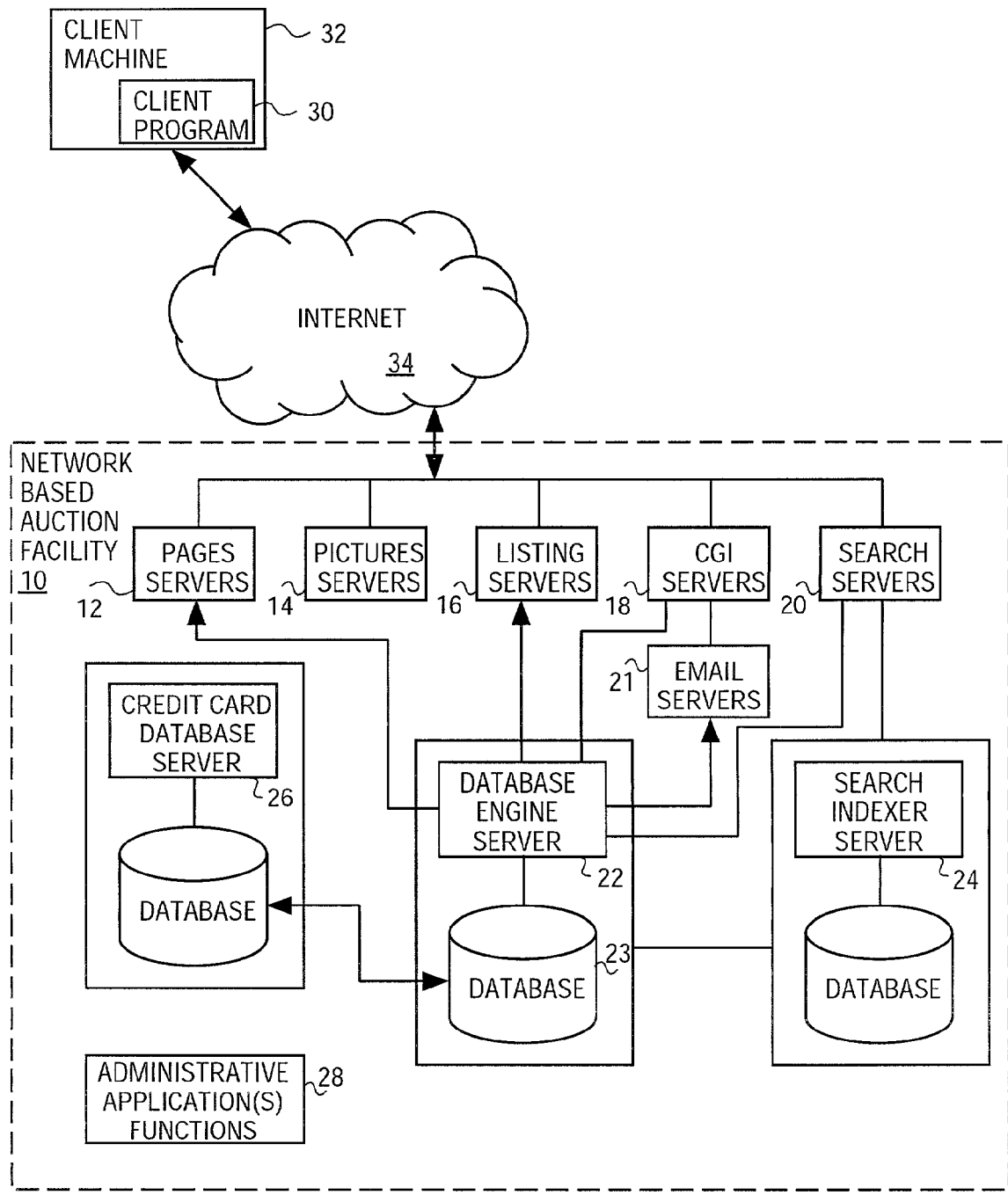
FIG. 1 is a block diagram of one embodiment of a network-based transaction facility.

FIG. 1 is a block diagram illustrating an exemplary network-based transaction facility in the form of an Internet-based auction facility 10. While an exemplary embodiment of the present invention is described within the context of an auction facility, it will be appreciated by those skilled in the art that the invention will find application in many different types of computer-based, and network-based, commerce facilities.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 2:
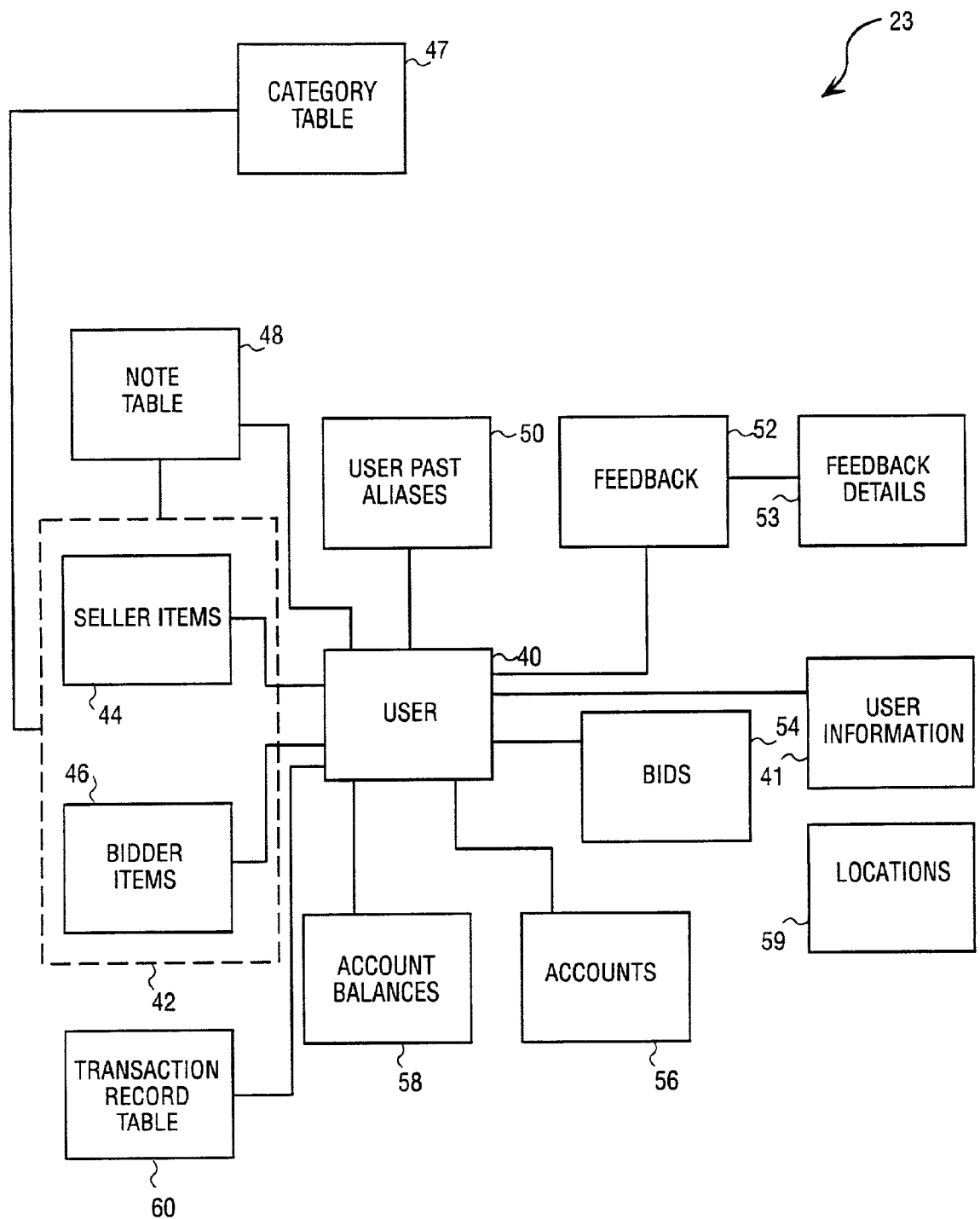
FIG. 2 is a block diagram of one embodiment of a database maintained by a database engine server.

FIG. 2 is a database diagram illustrating an exemplary database 23, maintained by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

Central to the database 23 is a user table 40, which contains a record for each user of the auction facility 10. A user may operate as a seller, buyer, or both, within the auction facility 10. A user information table 41 is linked to the user table 40 and includes more detailed information about each user. The database 23 also includes item tables 42 that may be linked to the user table 40. Specifically, the tables 42 include a seller items table 44 and a bidder items table 46. A user record in the user table 40 may be linked to multiple items that are being, or have been, auctioned via the facility 10. A link indicates whether the user is a seller or a bidder (or buyer) with respect to items for which records exist within the item tables 42. The database 23 also includes a note table 48 populated with note records that may be linked to one or more item records within the item tables 42 and/or to one or more user records within the user table 40. Each note record within the table 48 may include, inter alia, a comment, description, history or other information pertaining to an item being auction via the auction facility 10, or to a user of the auction facility 10.

A number of other tables are also shown to be linked to the user table 40, namely a user past aliases table 50, a feedback table 52, a bids table 54, an accounts table 56, an account balances table 58 and a transaction record table 60. In addition, the database 23 includes a locations table 59 which stores valid demographic information that is used to verify registration information submitted by users during the registration process.

Figure 3:
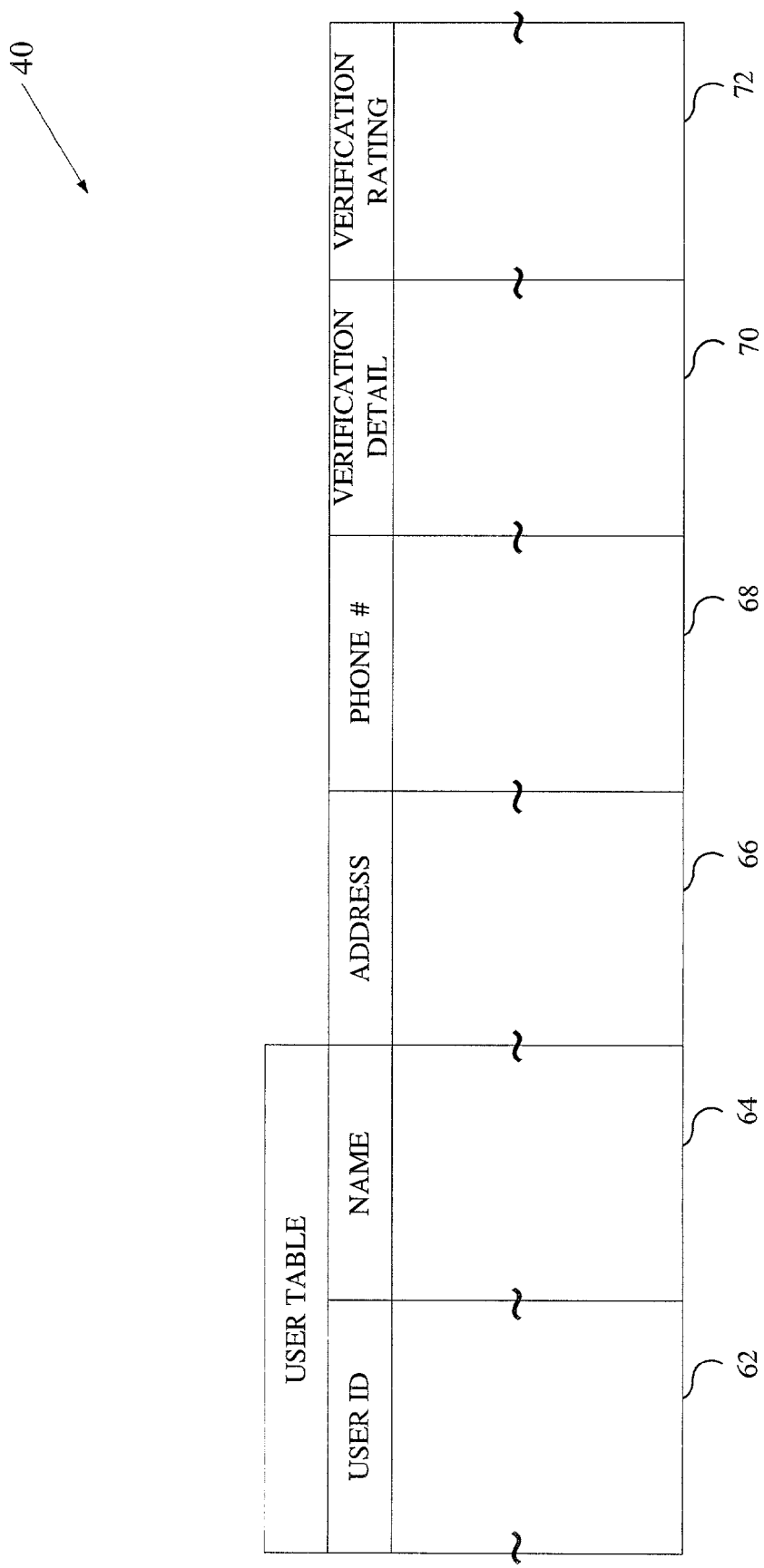
FIG. 3 is a diagrammatic representation of one embodiment of a user table within the database.

FIG. 3 is a diagrammatic representation of an exemplary embodiment of the user table 40 that is populated with records, or entries, for each user of the auction facility 10. The table 40 includes a user identifier column 62 that stores a unique identifier for each user. A name column 64 stores a first name, a middle initial and a last name for each user. An address column 66 stores full address information for each user, e.g. a street name and number, city, zip code, state, country, etc. A phone number column 68 stores a home phone number for each user. A verification detail column 70 stores, for each user, a set of scores pertaining to the accuracy of registration information submitted by the user during the registration process. Each score within the set characterizes a result of a validity check performed on a certain piece of the registration information. A verification rating column 72 stores a total score assigned to the user based on the set of scores contained in the verification detail column 70.

It will be appreciated that any information other than that described above may populate the user table 40 without loss of generality.

Figure 4:
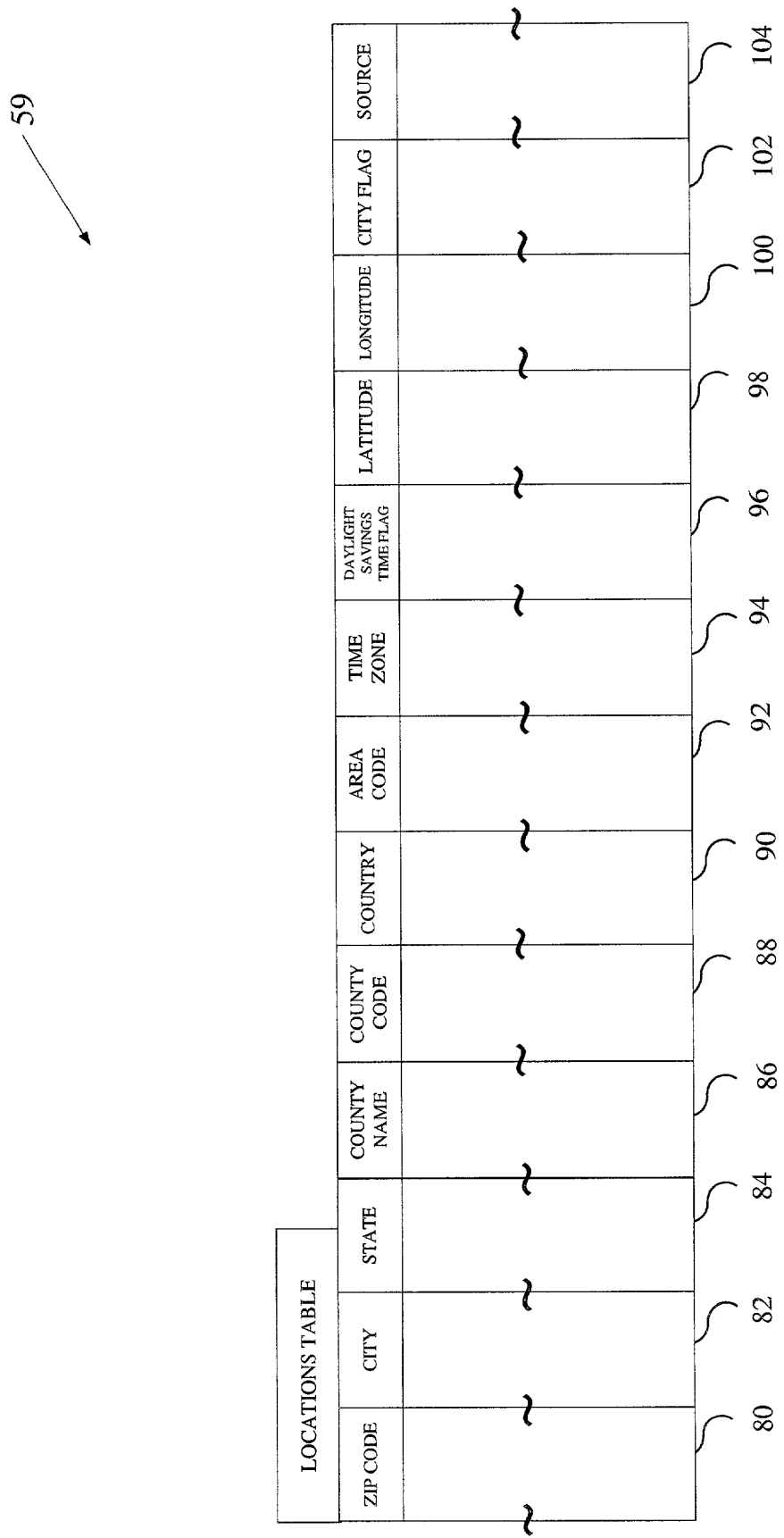
FIG. 4 is a diagrammatic representation of one embodiment of a locations table within the database.

FIG. 4 is a diagrammatic representation of an exemplary embodiment of the locations table 59. The locations table 59 stores a list of current zip codes and associated location information. In one embodiment, the data stored in the locations table 59 is imported from a commercial database and is periodically completely repopulated with a new release of the commercial database. Alternatively, the data stored in the locations table 59 is obtained from various sources including various commercial databases and/or the auction facility 10 itself. The table 59 includes a zip code column 80 that stores a list of current zip codes in the U.S. and abroad. Each zip code corresponds to valid city information stored in a city column 82. A flag stored in a column 102 indicates whether the city information stored in the column 82 is for a main city or an alias city. The zip code information stored in the column 80 is also correlated with area code information stored in an area code column 92 and with other location information stored in a state column 84, county name column 86, county code column 88, country column 90, time zone column 94, latitude column 98, and longitude column 100. A column 95 includes a flag indicating, for each entry, whether daylight savings time is adopted in this geographic area. A source column 104 stores a value indicating the source of the record, i.e., whether the recorded was imported from a certain commercial database, created by an administrator of the auction facility 10, or was originated by other source.

It will be appreciated that other demographic information may also populate the locations table 59.

Registration Process

As discussed above, a network-based transaction facility such as the auction facility 10 should maintain such a level of identity verification of new users during the registration process as not to unnecessary limit access to the facility. One embodiment of the present invention proposes a method and apparatus whereby an applicant is registered with an auction facility if the auction facility obtains a reasonable assurance of the applicant's identity. While the present invention is discussed within the environment of the auction facility 10, it will readily be appreciated that the present invention may be extended to providing identity verification in other environments including network-based transaction facilities (e.g., business-to-business, business-to-consumer and consumer-to-consumer Internet marketplaces and retailers) and on-line communities.

Figure 5:
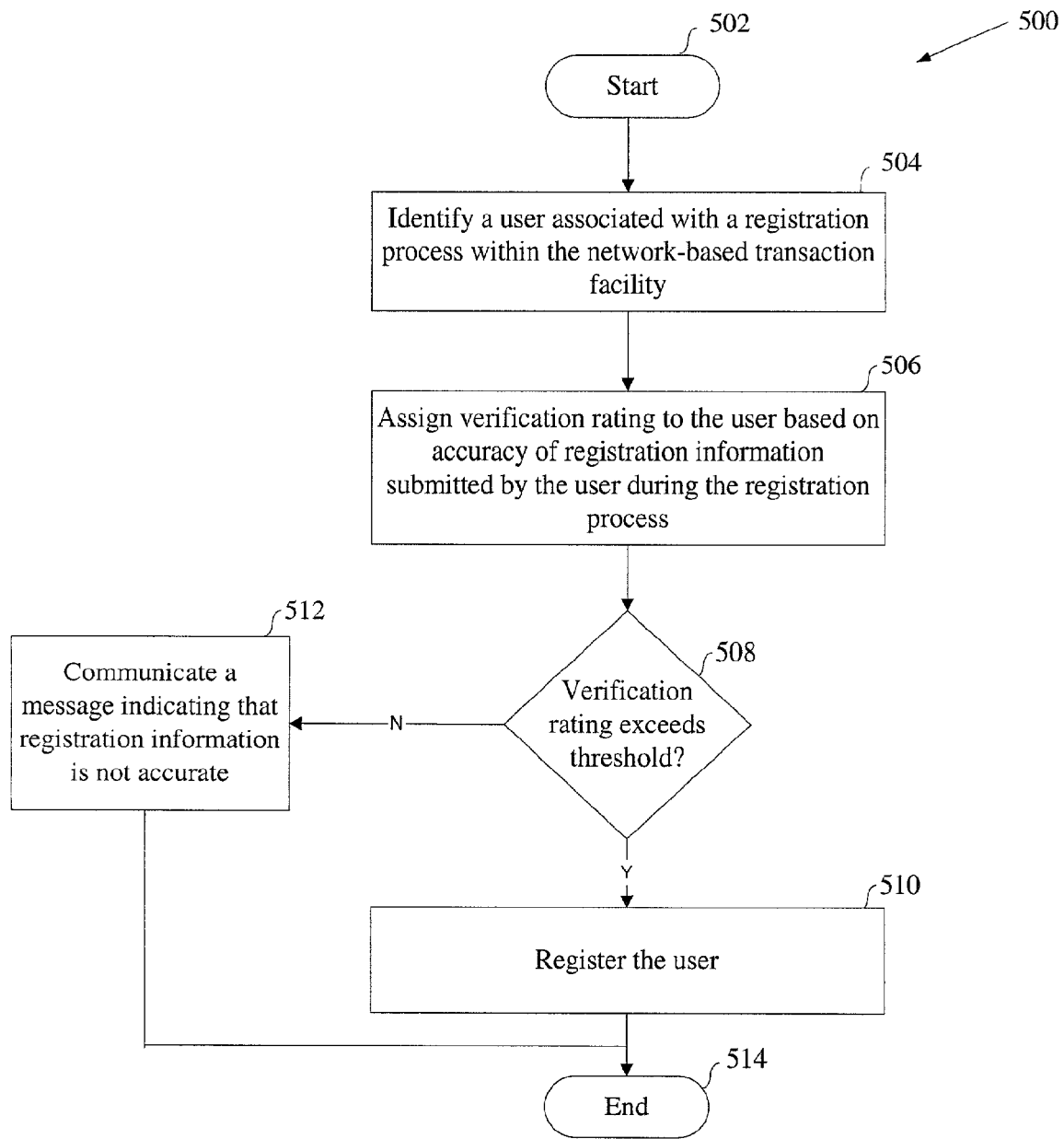
FIG. 5 is a flow diagram of one embodiment for a method of facilitating a registration process in a network-based transaction facility.

FIG. 5 is a flow diagram of a method 500 for facilitating a registration process in a network-based transaction facility, according to an exemplary embodiment of the present invention, that may be implemented by the auction facility 10. The method 500 commences with identifying a user associated with a registration process within the network-based transaction facility (processing block 504). In one embodiment, the user associated with the registration process is identified upon receiving a user request to register. Then, a registration interface is communicated to the user to obtain the user's registration information. The registration information may include, for example, the user's name, address, phone number, email address, etc.

At processing block 506, the user is assigned a verification rating based on the accuracy of the registration information submitted by the user. The verification rating may be assigned during registration of a new user or at the time when an existing user attempts to change his or her registration information. In one embodiment, the verification rating is assigned using demographic information stored in the locations table 59 of the database 23. Specifically, the locations table 59 is searched to find data matching various portions of the user's registration information. One embodiment of a method for assigning a verification rating to a user is described in greater detail below in conjunction with FIG. 6.

At decision box 508, a determination is made as to whether the assigned verification rating exceeds a predetermined threshold. The value of the predetermined threshold may vary depending on various factors including the size of the transaction facility, its type and manner of operation, etc. For instance, the threshold may be initially set to a lower value and then be increased as a transaction facility grows in size. Similarly, the threshold may be set to a higher value if participants of the transaction facility are companies and organizations rather than individuals. By varying the threshold value, the transaction facility can control access restrictions for new registrants.

If the verification rating assigned to the user exceeds the predetermined threshold, the user is registered with the transaction facility (processing block 510). Alternatively, a message may be communicated to the user indicating that the registration information is not accurate (processing block 512). For instance, an inaccurate portion of the registration information may be marked as incorrect, or a message asking the user to double check provided information may appear next to the inaccurate information. The user may then be allowed to resubmit the corrected information which will be processed as described above.

Figure 6:
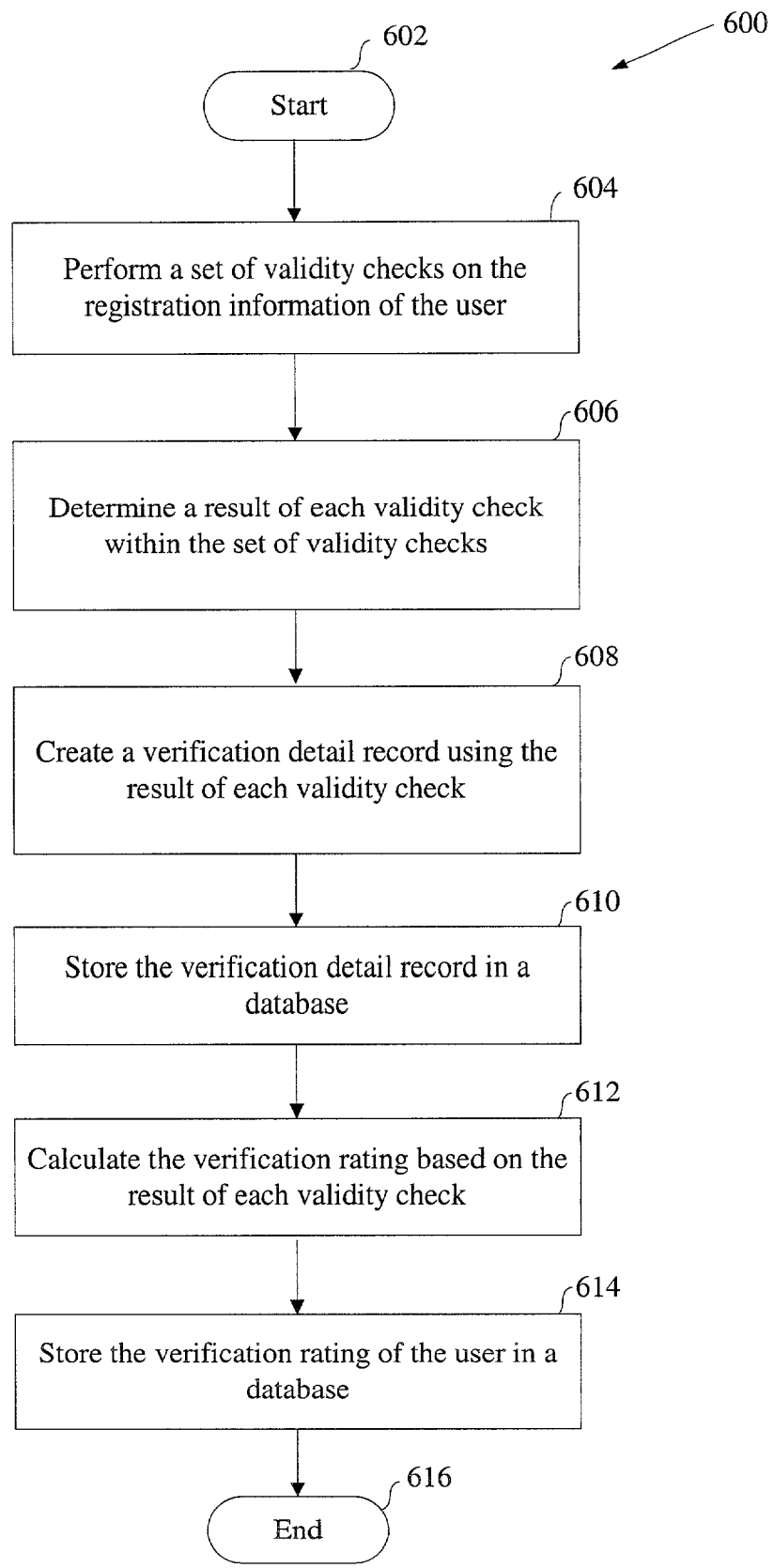
FIG. 6 is a flow diagram of one embodiment for a method of assigning a verification rating to a user.

FIG. 6 is a flow diagram of one embodiment for a method 600 of assigning a verification rating to a user. The method 600 commences with performing a set of validity checks on the user's registration information (processing block 604). In one embodiment, each of these validity checks verifies the accuracy of certain demographic data within the registration information. Specifically, a validity check may determine whether the format of the phone number provided by the user is correct or whether the address or phone information provided by the user appears to be accurate. In one embodiment, the accuracy of the address and phone information is tested using the locations table 59 which stores valid demographic information (i.e., a list of existing zip codes correlated with valid area codes and location information). For instance, a validity check may verify whether an area code or zip code provided by the user is valid by matching the area code or zip code with the data stored in the locations table 59. Additionally, some validity checks may verify whether the zip code, area code, city and state provided by the user properly correlate with each other using valid demographic data stored in the locations table 59.

At processing block 606, the result of each validity check performed on the user's registration information is determined. In one embodiment, the result is represented by a numerical score indicating whether a corresponding validity check has passed or failed. In one embodiment, a set of verification rules is used to define what validity checks to perform and how to translate the performed validity checks into numerical scores. An exemplary set of verification rules is illustrated in FIG. 7 which will be described in greater detail below.

Further, a verification detail record is created using the results of the performed validity checks (processing block 608) and stored in a database, e.g., in the user table 52 of the database 23 (processing block 610). The verification detail record contains information identifying the resulting score of each validity check performed on the user registration information.

Afterwards, a verification rating is calculated (processing block 612) and stored in a database, e.g., in the user table 52 of the database 23 (processing block 614). The verification rating is a total of all the scores resulting from performing the validity checks on the user registration information. The verification rating and verification detail record may be updated each time the user modifies his or her registration information. In one embodiment, the verification rating and verification detail record is accessible only internally (e.g., by customer support or billing personnel of the transaction facility). Alternatively, this information may also be accessible by other users of the transaction facility.

Figure 7:
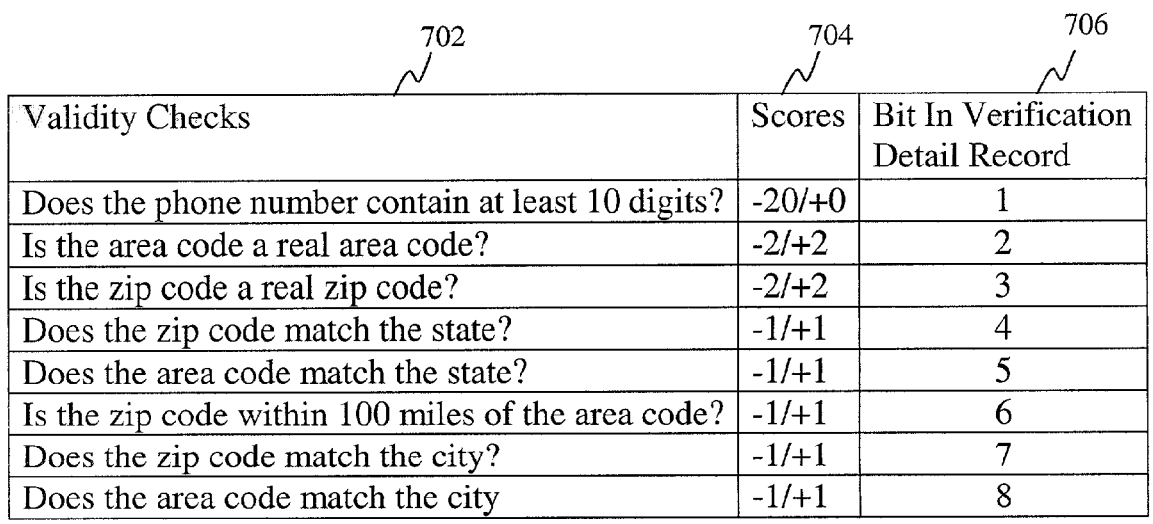
FIG. 7 illustrates an exemplary set of verification rules.

FIG. 7 illustrates an exemplary set of verification rules used to verify user registration information. Each verification rule defines a validity check (column 702), a score for passing the validity check and a score for failing the validity check (column 704), and location of a resulting score within the verification detail record (column 706). For instance, when the validity check verifying the format of the phone number is performed, the number of digits in the phone number is calculated. If the phone number contains 10 digits or more, the first bit of the verification detailed record will store the value of 0, which indicates that the above test has passed. Similarly, when the check verifying the validity of the area code provided by the user is performed, the locations table 59 of the database 23 is searched. If the user's area code matches an area code in the locations table 59, the second bit of the verification detail record will store the value of 2. Otherwise, if no matching area code is found, the second bit will store the value of −2, thereby indicating that the area code validity check has failed. When the validity checks are performed, their scores are added to calculate the verification rating. This verification rating is then used to determine whether the user should be allowed to register or not. Specifically, the user will be allowed to register only if the verification rating exceeds a predefined threshold.

It should be noted that a wide variety of other validity checks and associated scores may be used to verify the accuracy of the user's registration information.

Computer Architecture

Figure 8:
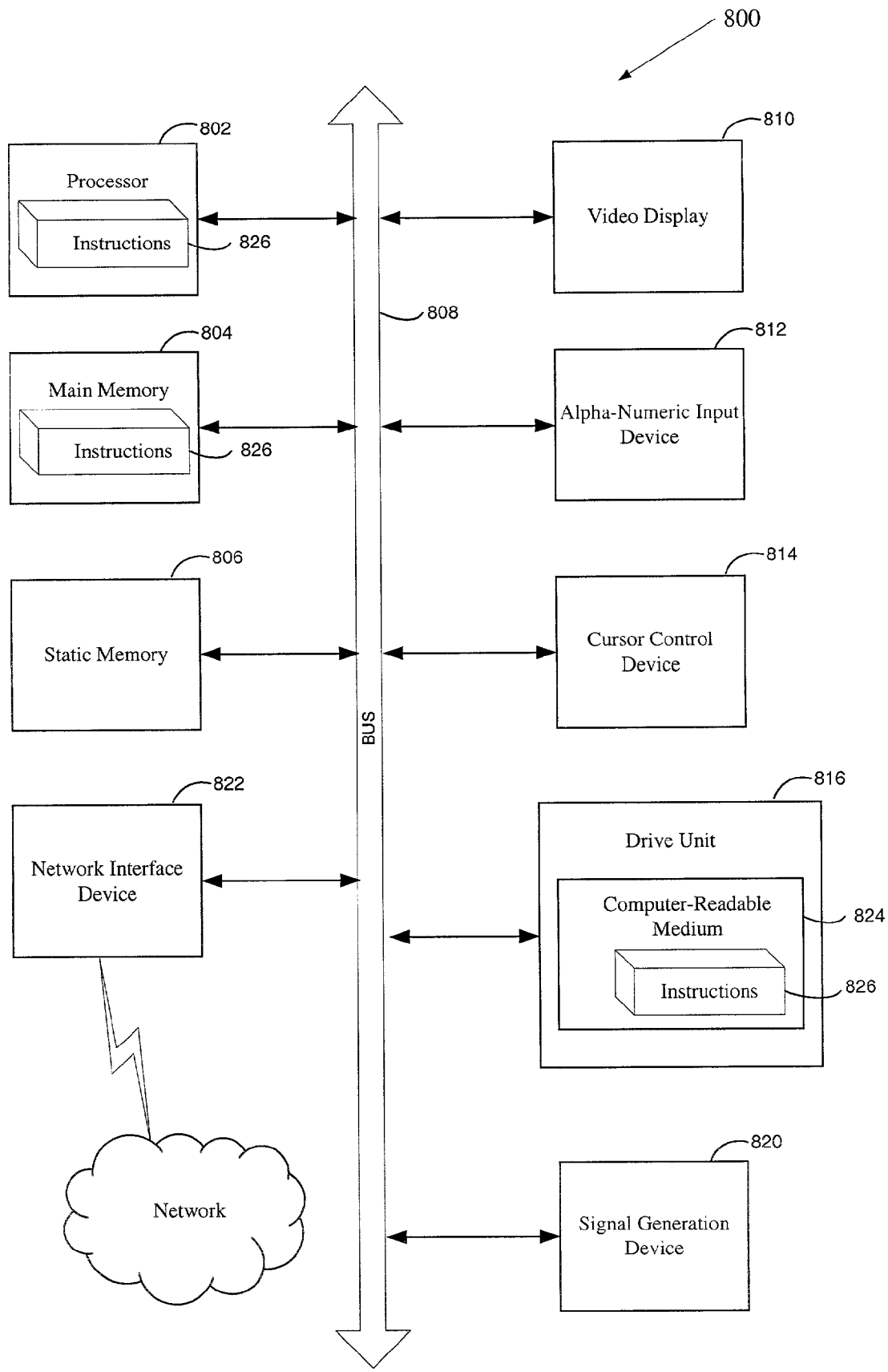
FIG. 8 is a block diagram of one embodiment of a computer system.

FIG. 8 shows a diagrammatic representation of machine in the exemplary form of a computer system 800 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 800 includes a processor 802, a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 820 (e.g., a speaker) and a network interface device 822.

The disk drive unit 816 includes a computer-readable medium 824 on which is stored a set of instructions (i.e., software) 826 embodying any one, or all, of the methodologies described above. The software 826 is also shown to reside, completely or at least partially, within the main memory 804 and/or within the processor 802. The software 826 may further be transmitted or received via the network interface device 822. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, a method and apparatus for facilitating user registration in a network-based transaction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for facilitating user registration in a network-based facility, the method comprising:
   identifying, in the network-based facility, a user associated with a registration process within the network-based facility;
   assigning, in the network-based facility, a verification rating to the user based on accuracy of registration information submitted by the user during the registration process; and
   registering the user with the network-based facility if the verification rating exceeds a predetermined threshold, to allow the user to interact with other users in the network-based facility, wherein the predetermined threshold is varied based on whether the user is a corporation or an individual.

2. The method of claim 1 wherein assigning the verification rating further comprises:
   performing a set of validity checks on the registration information of the user;
   determining a result of each validity check within the set of validity checks; and
   calculating the verification rating based on the result of each validity check.

3. The method of claim 2 wherein each validity check verifies validity of a corresponding piece of the registration information of the user.

4. The method of claim 2 further comprising utilizing a set of verification rules to define the set of validity checks, and translating the result of each validity check into a numerical value.

5. The method of claim 2 further comprising:
   creating a verification detail record using the result of each validity check; and
   storing the verification detail record in a database.

6. The method of claim 1 further comprising storing the verification rating of the user in a database.

7. The method of claim 1 wherein the registration information comprises demographic information of the user.

8. The method of claim 1 further comprising:
   maintaining a database of valid demographic information; and
   determining whether demographic information entered by the user matches any of the valid demographic information from the database.

9. The method of claim 8 wherein the valid demographic information defines correlation between a plurality of area codes and a plurality of location information.

10. The method of claim 9 wherein each of the plurality of location information includes any one of the group comprising country information, zip code information, state information, city information, time zone information, latitude information, and longitude information.

11. The method of claim 8 wherein the valid demographic information defines correlation between a plurality of area codes and a plurality of location information.

12. The method of claim 1 further comprising providing user interface information to the user via a communications network, the user interface information specifying a registration interface for obtaining registration information of the user.

13. A system for facilitating user registration in a network-based facility, the system comprising:
   means for identifying, in the network-based facility, a user associated with a registration process within the network-based facility;
   means for assigning, in the network-based facility, a verification rating to the user based on accuracy of registration information submitted by the user during the registration process; and
   means for registering the user with the network-based facility if the verification rating exceeds a predetermined threshold, to allow the user to interact with other users in the network-based facility, wherein the predetermined threshold is varied based on whether the user is a corporation or an individual.

14. An apparatus for facilitating user registration in a network-based facility, the apparatus comprising:
   an identification function to identify, in the network-based facility, a user associated with a registration process within the network-based facility;
   a set of verification rules to assign, in the network-based facility, a verification rating to the user based on accuracy of registration information submitted by the user during the registration process; and
   a registration function to register the user with the network-based facility if the verification rating exceeds a predetermined threshold, to allow the user to interact with other users in the network-based facility, wherein the predetermined threshold is varied based on whether the user is a corporation or an individual.

15. The apparatus of claim 14 wherein the registration function is to perform a set of validity checks on the registration information of the user, to determine a result of each validity check within the set of validity checks, and to calculate the verification rating based on the result of each validity check.

16. The apparatus of claim 15 wherein each validity check verifies validity of a corresponding piece of the registration information of the user.

17. The apparatus of claim 15 wherein the registration function is to further utilize a set of verification rules for defining the set of validity checks, and to translate the result of each validity check into a numerical value.

18. The apparatus of claim 15 wherein the registration function is to further create a verification detail record using the result of each validity check, and to store the verification detail record in a database.

19. The apparatus of claim 14 further comprising a database to store the verification rating of the user.

20. The apparatus of claim 14 wherein the registration information comprises demographic information of the user.

21. The apparatus of claim 14 further comprising a database of valid demographic information, and wherein the registration module is to further determine whether demographic information entered by the user matches any of the valid demographic information from the database.

22. The apparatus of claim 21 wherein the valid demographic information defines correlation between a plurality of area codes and a plurality of location information.

23. The apparatus of claim 22 wherein each of the plurality of location information includes any one of the group comprising country information, zip code information, state information, city information, time zone information, latitude information, and longitude information.

24. The apparatus of claim 21 wherein the valid demographic information defines correlation between a plurality of area codes and a plurality of location information.

25. The apparatus of claim 14 further comprising a client computer to provide user interface information to the user via a communications network, the user interface information specifying a registration interface for obtaining registration information of the user.

26. A computer readable medium that provides instructions, which when executed on a processor, cause the processor to perform operations comprising:
   identifying, in a network-based facility, a user associated with a registration process within the network-based facility;
   assigning, in the network-based facility, a verification rating to the user based on accuracy of registration information submitted by the user during the registration process; and
   registering the user with the network-based facility if the verification rating exceeds a predetermined threshold, to allow the user to interact with other users in the network-based facility, wherein the predetermined threshold is varied based on whether the user is a corporation or an individual.

27. The method of claim 1, wherein the network-based facility comprises a network-based auction facility.

28. The method of claim 27, wherein the registering is to allow the user to conduct sale and purchase transactions with other users in the network-based auction facility.

29. The system of claim 13, wherein the network-based facility comprises a network-based auction facility.

30. The system of claim 29, wherein the means for registering is to allow the user to conduct sale and purchase transactions with other users in the network-based auction facility.

31. The apparatus of claim 14, wherein the network-based facility comprises a network-based auction facility.

32. The system of claim 31, wherein the registration function is to allow the user to conduct sale and purchase transactions with other users in the network-based auction facility.

33. The computer readable medium of claim 26, wherein the network-based facility comprises a network-based auction facility.

34. The computer readable medium of claim 33, wherein the registering is to allow the user to conduct sale and purchase transactions with other users in the network-based auction facility.

* * * * *